(12) United States Patent
Wilkinson et al.

(10) Patent No.: US 6,880,784 B1
(45) Date of Patent: Apr. 19, 2005

(54) AUTOMATIC TAKEOFF THRUST MANAGEMENT SYSTEM

(75) Inventors: Todd Wilkinson, Rosamond, CA (US); Darrell Pederson, Valencia, CA (US)

(73) Assignee: Supersonic Aerospace International, LLC, Las Vegas, NV (US)

( * ) Notice: Subject to any disclaimer, the term of this patent is extended or adjusted under 35 U.S.C. 154(b) by 0 days.

(21) Appl. No.: 10/435,215

(22) Filed: May 8, 2003

(51) Int. Cl.[7] .............................................. B64D 31/06
(52) U.S. Cl. .................................... 244/76 R; 244/195
(58) Field of Search ............................ 244/76 R, 76 A, 244/76 B, 182, 194, 188, 195; 701/100, 102; 60/39.15, 223

(56) References Cited

U.S. PATENT DOCUMENTS

| | | | | |
|---|---|---|---|---|
| 4,019,702 A | * | 4/1977 | Annin ........................ | 244/182 |
| 4,034,938 A | * | 7/1977 | Borelan et al. ............. | 244/188 |
| 4,662,171 A | * | 5/1987 | Jackson et al. ............ | 60/39.15 |
| 5,136,841 A | * | 8/1992 | Zimmerman ................ | 60/223 |
| 5,299,765 A | * | 4/1994 | Blechen .................... | 244/182 |
| 5,337,982 A | * | 8/1994 | Sherry ....................... | 244/186 |
| 6,275,765 B1 | * | 8/2001 | Divljakovic et al. ........ | 701/102 |

* cited by examiner

Primary Examiner—Galen Barefoot
(74) Attorney, Agent, or Firm—Koestner Bertani LLP; Ken J. Koestner

(57) ABSTRACT

An automatic takeoff thrust management system can be used in an aircraft with at least two engines. The management system comprises an aircraft status sensor or set of sensors capable of detecting establishment of takeoff climb conditions, and engine failure detectors respectively coupled to the at least two engines and capable of detecting engine failure. The management system further comprises thrust control modules respectively coupled to the at least two engines and capable of controlling the thrust of the engines, and a controller coupled to the aircraft status sensors, the engine failure detectors, and the thrust control modules. The controller reduces thrust by a selected amount upon detecting establishment of takeoff climb conditions and, if engine failure is detected, restoring thrust to an initial or a higher schedule.

25 Claims, 7 Drawing Sheets

AUTOMATIC TAKEOFF THRUST MANAGEMENT SYSTEM

BACKGROUND OF THE INVENTION

In the past decades, travel by aircraft has become commonplace, population has greatly increased particularly in urban and metropolitan areas, and the number of daily flights has expanded proportionately. Population density enlargement in the vicinity of airports in combination with a high frequency of takeoffs and landings has expectedly resulted in public criticism of nuisance, inconvenience, and damage created by noise inherent to the air travel industry. National and international agencies, aircraft manufacturers, engine manufacturers, and others have responded to the criticism by establishing noise emission standards for aircraft and aircraft traffic limitations for particular communities. The United States Federal Aviation Administration (FAA) has imposed noise limits on takeoff and landing.

Noise rules generally limit aircraft noise that can be emitted during takeoff and during approach to landing. Aircraft noise has many constituent parts including engine fan noise, engine combustion noise, airframe noise, and jet noise caused by shearing of airflow. Engine noise during takeoff is usually the largest noise component because the engine is then at the highest power setting. Jet noise is a prevalent engine noise component at high engine thrust conditions.

Many techniques for suppressing engine noise have been developed. In one example, engine secondary-to-primary mass flow bypass ratios are increased to values of five to eight to decrease peak jet velocities, shear layer velocity gradients, and turbulence, thereby reducing noise. Some aircraft use "hush kits" such as ejectors or free mixers, and forced mixers to mix high velocity hot engine streams with cooler low velocity freestream air to decrease peak jet velocity and shift from low frequency to more absorbable high frequency noise. In other examples, some conventional engine noise reduction systems use suction devices. Alternatively, suction devices have been used to reduce aerodynamic drag.

Various techniques have been developed to reduce airframe noise, defined as objectionable audible noises during departure and approach conditions from an aircraft and induced by airflow, not related to the engine during operation. Airframe noise can reach or exceed engine noise levels during aircraft landing. Conventional techniques typically address airframe noise by thickening the shear layer adjacent the end of the aircraft body by positioning protuberances adjacent the end of the body. Unfortunately, the devices attached to an aircraft may introduce new noise sources even while reducing some airflow-related noise.

Known techniques successfully reduce noise levels, at least to some degree. However, further reductions are always desirable. Furthermore, the conventional techniques impact performance by one or more of adding weight to the aircraft, reducing engine performance, reducing aerodynamic performance, increasing fuel consumption, reducing range, and/or increasing engine complexity in ways that can compromise engine performance and reliability, increasing the possibility of breakdown and increasing cost.

Noise abatement flight procedures are constantly evolving with advances in technology, improved aircraft design, and implementation of airspace management procedures. Many efforts to address aircraft noise have been targeted to reduction of noise at the source. Aircraft are required to meet government noise certification standards. Compliance with these standards must be considered in the design of new aircraft.

SUMMARY OF THE INVENTION

An aircraft includes an Automatic Takeoff Thrust Management System (ATTMS) to reduce or minimize takeoff noise in a limited takeoff field length. In particular embodiments, the automatic takeoff thrust management system can include a programmed lapse rate function that automatically reduces thrust in appropriate conditions after takeoff.

The automatic takeoff thrust management system not only increases power in the event of an engine failure but also modulates thrust as soon as the aircraft establishes takeoff climb conditions. Previous systems have increased thrust only in the event of engine failure, as specified according to Federal Aviation Regulations (FAR) 25.904 and Appendix I25.5, and required that reduced thrust be set during takeoff roll. The automatic takeoff thrust management system described herein reduces takeoff sound levels while supplying additional thrust for heightened climb performance if an engine failure event occurs during takeoff.

Aircraft typically employ normal takeoff thrust from all engines during takeoff roll phase to achieve desired takeoff field lengths. After liftoff, less thrust is needed for the takeoff-climb phase with all engines operating. Usage of full takeoff thrust after liftoff results in noise levels greater than desired for the aircraft. If all engines are operating, thrust is automatically reduced by a selected amount after liftoff once the takeoff-climb phase is securely established.

The automatic takeoff thrust management system performs analysis to determine the point in the flight path that the reduction takes place. The analysis includes logical determination that climb is established based on one or more parameters. Suitable parameters include, but are not limited to, weight-on-wheels sensing, main landing gear position, airspeed, angle-of-attack, rate-of-climb, and others.

In some embodiments, the automatic takeoff thrust management system controls thrust reduction to approximate thrust lapse-rate effects that occur naturally due to increasing altitude and airspeed. A selected thrust reduction characteristic can be programmed into control schedules that respond to signals received from sensors and/or control actuators in the aircraft.

In accordance with various embodiments of an aircraft thrust management system, if all engines are operating thrust is automatically reduced by a selected amount after liftoff, once take-off climb is safely established. In a particular embodiment, thrust is automatically reduced by approximately ten percent once climb is established.

In accordance with some embodiments of the illustrative system, an automatic takeoff thrust management system can be used in an aircraft with at least two engines. The management system comprises an aircraft status sensor or set of sensors capable of detecting establishment of takeoff climb conditions, and engine failure detectors respectively coupled to the at least two engines and capable of detecting engine failure. The management system further comprises thrust management modules respectively coupled to the at least two engines and capable of controlling the thrust of the engines, and a controller coupled to the aircraft status sensors, the engine failure detectors, and the thrust control modules. The controller reduces thrust by a selected amount upon detecting establishment of takeoff climb conditions and, if engine failure is detected, restores thrust to the initial or a higher schedule.

In a particular embodiment, takeoff distance in compliance with Federal Aviation Regulations (FAR) Part 25 is based at least in part on One-Engine-Inoperative (OEI) acceleration that occurs if an engine fails after reaching a takeoff decision speed. The automatic takeoff thrust management system is programmed to sense an engine failure event after reaching takeoff decision speed and responding by increasing available thrust. In the illustrative embodiment, the automatic takeoff thrust management system increases thrust approximately ten percent for OEI acceleration. The automatic takeoff thrust management system is programmed to sense engine failure and responds by increasing thrust on the operating engine to a maximum OEI thrust rating. The one-engine-operative (OEI) thrust rating can be imposed temporarily, for example for several minutes, in the event of an engine failure during takeoff. The automatic takeoff thrust management system detects the OEI condition based on information and/or absence of information in engine control system sensors and/or dedicated sensors on the failed engine.

If an engine failure occurs during take-off climb after the climb established point, the automatic takeoff thrust management system automatically increases thrust. In some embodiments, the automatic takeoff thrust management system increases takeoff thrust to maximum OEI rating.

The maximum landing weight of the aircraft is often such that unmodified takeoff thrust or go-around thrust is sufficient to meet all Federal Aviation Administration (FAA) climb requirements for landing-climb (go-around) without using automatic thrust management or control. Therefore, in some embodiments the automatic takeoff thrust management system can be enabled to function only during takeoff.

In accordance with another embodiment, an aircraft comprises a fuselage, wings coupled to opposing sides of the fuselage, at least two engines mounted on the paired wings symmetrically with respect to the fuselage, and an automatic takeoff thrust management system. The automatic takeoff thrust management system comprises an aircraft status sensor or set of sensors capable of detecting establishment of takeoff climb conditions, and engine failure detectors respectively coupled to the at least two engines and capable of detecting engine failure. The automatic takeoff thrust management system further comprises thrust control modules respectively coupled to the at least two engines and capable of controlling the thrust of the engines, and a controller coupled to the aircraft status sensors, the engine failure detectors, and the thrust control modules. The thrust management system reduces thrust by a selected amount upon detecting establishment of takeoff climb conditions and, if engine failure is detected, restoring thrust to the initial or a higher schedule.

In accordance with a further embodiment, a method of automatically controlling takeoff thrust in an aircraft comprises detecting establishment of takeoff climb conditions, detecting engine failure if engine failure occurs, reducing thrust by a selected amount upon detection of established takeoff climb conditions. The method further comprises restoring thrust to the initial or a higher schedule if engine failure is detected.

In accordance with another embodiment, an article of manufacture comprises a computer usable medium having computer readable program code means embodied therein for detecting establishment of takeoff climb conditions, and a computer readable program code means for detecting engine failure if engine failure occurs. The article of manufacture further comprises a computer readable program code means for reducing thrust by a selected amount upon detecting establishment of takeoff climb conditions, and a computer readable program code means operational when engine failure is detected for restoring thrust to the initial or a higher schedule.

BRIEF DESCRIPTION OF THE DRAWINGS

Embodiments of the invention relating to both structure and method of operation, may best be understood by referring to the following description and accompanying drawings.

DETAILED DESCRIPTION OF THE EMBODIMENTS

A high performance aircraft has design characteristics that specify excess thrust for all-engine takeoff climb, full thrust for takeoff roll, and full thrust or higher for engine-out takeoff climb. In some embodiments, the high performance aircraft is a supersonic transport aircraft. Use of full takeoff thrust for all-engine takeoff climb can result in higher than desired noise levels. Current Federal Aviation Administration (FAA) airworthiness standards define takeoff procedures where no change in thrust that requires action by the pilot may be made until the airplane is 400 feet above the takeoff surface. An automatic takeoff thrust control system satisfies FAA requirements and reduces community noise exposure. The automatic takeoff thrust management system reduces thrust after climb conditions are established, but, in the event of engine failure, increases thrust to meet FAA engine-out climb specifications.

Figure 1:
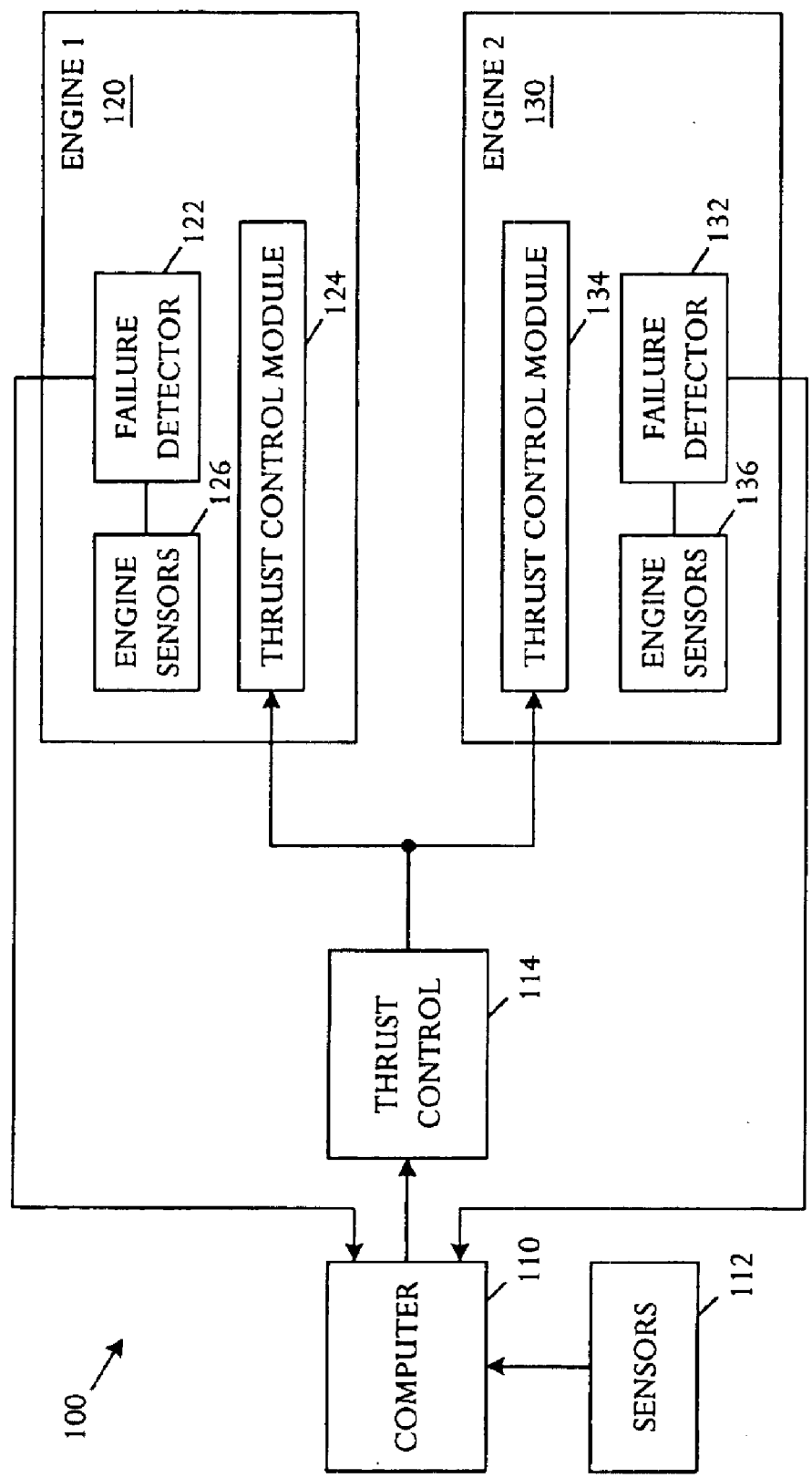
FIG. 1 is a schematic block diagram showing an embodiment of an automatic thrust management system that can be used in an aircraft.

Referring to FIG. 1, a schematic block diagram depicts an automatic thrust management system 100 that can be used in an aircraft. In the illustrative embodiment, the automatic thrust management system 100 comprises a first engine 120 and a second engine 130, a computer 110, sensors 112, and a thrust level control 114. The individual engines 120 and 130 each include failure detectors 122 and 132, respectively, and thrust control modules 124 and 134, respectively.

The automatic takeoff thrust management system 100 comprises one or more sensors 112 that supply signals to a vehicle management computer or controller 110. The computer 10 responds to the sensed signals by sending signals that control engine thrust level. In some embodiments, for normal operation the computer reduces thrust by approximately ten percent when aircraft status sensors indicate the aircraft has established takeoff climb conditions. If engine failure occurs after the thrust decrease, engine status sensors detect the engine failure and restore thrust to the initial or a higher schedule.

The automatic takeoff thrust management system 100 reduces takeoff sound levels while supplying safe climb performance in the event of engine failure during takeoff. The automatic takeoff thrust management system increases power upon detection of engine failure, but also reduces thrust under normal conditions once takeoff-climb is established.

The automatic thrust management system 100 receives control signals from a thrust level control 114 that may be set manually by a pilot to select a desired total output thrust by the engines 120 and 130. The thrust level control 114 generates manual thrust signals that may be overridden by automatic controls. Sensors 112 are included for detecting various control parameters such as engine speed or Mach number, engine inlet temperature, engine revolutions per minute, engine inlet pressure, weight on wheels, and others. The computer 110 is connected to receive signals from the thrust level control 114 and sensor signals from the sensors 112. The computer 110 comprises processing, storage, and logic elements capable of executing programs, methods, and processes for monitoring and analyzing the thrust level and sensor signals and, based on control requests and signal analysis, generating a command value. The command value controls the thrust control modules 124 and 134 of the respective engines 120 and 130. The thrust control modules 124 and 134 respond to the command value by continuously regulating fuel flow and other control effectors for the engines 120 and 130.

Engine failure detectors 122 and 132 typically monitor selected operational parameters and indicate failure in response to selected parameters or combinations of parameters exceeding predetermined limit values. If one or more of the engine failure detectors 122 and 132 detect engine failure or a condition indicating the risk of failure, signals indicative of the condition pass to the computer 110. Typically the signals are also supplied by visual or audio warning to the pilot.

In response to signals from the failure detectors 122 and 132, the computer 110 can automatically respond to complete or partial engine failure using various techniques to control operating engine power levels. In a particular embodiment, the engine failure detectors 122 and 132 monitor engine revolutions per minute (RPM) with an RPM loss being indicative of possible engine failure. A desired failure detector works in the expected manner and avoids false indications. Some embodiments may use other or additional sensors for redundancy and self-checking. Multiple or dual sensors may improve reliability by avoiding false positive and false negative indications.

In various embodiments, the computer 110 can manipulate engine limits, rotor speeds, and turbine temperature to supply sufficient engine power for safe aircraft operation. The computer 110 can address partial or intermittent engine failure that results in power loss, for example by increasing the power in remaining operating engines.

The engine failure detectors 122 and 132 respectively receive signals from engine sensors 126 and 136 and can use various techniques to detect partial or complete power loss or engine failure. The failure detectors 122 and 132 assess engine performance by monitoring one or more engine performance parameters selected from among engine rotational speeds, engine pressure ratios, and exhaust gas temperatures. In some embodiments, oil supply to critical parts such as bearings and fuel supply can be monitored for indicators of quantity, pressure, and temperature. In some embodiments, vibration can be monitored during engine operation to detect improper balance from failure of rotating parts or other mechanical distress. The illustrative parameters may be monitored to detect early indications of total or partial engine failure.

In various embodiments, particular temperature parameters for monitoring may include inlet, external air, compressor, turbine, bleed air, and exhaust temperatures. In some embodiments, particular pressure parameters that may be monitored include inlet, compressor discharge, lubrication oil, and bleed air pressures. Oil system measurements may be selected from among air quantity, filter status, oil consumption, contamination, and debris. Vibration sensors may detect vibration in afterburners, rotors, shafts, bearings, reduction gears, and others. Miscellaneous monitored parameters may include life usage such as hours of operation, start times, fatigue, stresses, and cracks. The engine failure detectors 122 and 132 may monitor speeds, throttle position, nozzle position, stator position, and fuel flow.

In another example, the engine failure detectors 122 and 132 can monitor engine performance including engine pressure ratio, fuel flow, rotational speed, exhaust gas temperature, and throttle position. The engine failure detectors 122 and 132 also monitor mechanical performance including oil consumption and vibration amplitude.

The engine failure detectors 122 and 132 can send information to the computer 110 to analyze the monitored parameters, in some embodiments comparing the monitored parameters to stored reference levels, evaluating shifts through time trending. In other examples, the computer 110 can perform expert analysis based on a library of faults determined by field experience and manufacturer data, neural network based diagnosis using nonlinear modeling techniques, artificial intelligence diagnostic techniques, and the like.

Sensors 112 indicate status of the aircraft, for example whether the aircraft has established takeoff climb conditions. Status sensors 112 are used in the illustrative embodiment to automatically control takeoff thrust. The sensors 112 can also be used to detect status for purposes of stability augmentation for pitch handling during flight, and for proper elevator adjustment.

In various embodiments, different sensors 112 and sensor combinations can be used. A highly useful status sensor is a weight-on-wheels detector. A typical weight-on-wheels detector uses one or more strain gages mounted on landing gear posts to determine whether a force is above or below a predetermined threshold force indicative of aircraft contact with the ground. Other typical weight-on-wheels detectors use position sensors or switches to detect compression of the landing gear as it supports the aircraft weight.

Other embodiments may supplement or replace the weight-on-wheels detector with other sensors 112. A landing gear truck attitude sensor can detect truck angle relative to landing gear posts, monitoring for an upward swinging tilt of the gear indicative of takeoff or a downward shift of the gear truck at touchdown.

Figure 2:
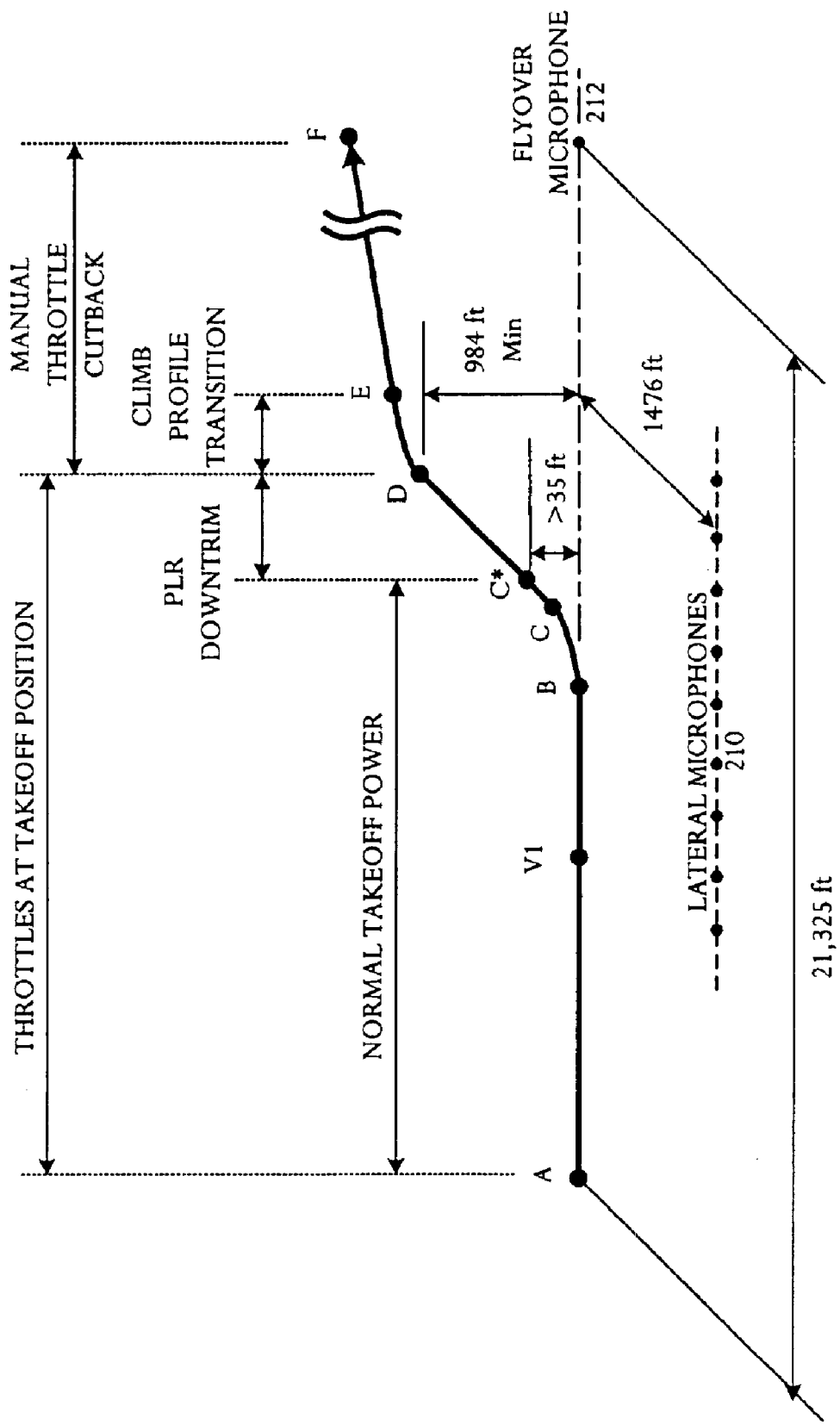
FIG. 2 is a three-dimensional graph showing a takeoff-climb profile definition used for acoustic noise determination.

Referring to FIG. 2, a graph shows a takeoff-climb profile definition from Federal Aviation Regulations Part 36 used for acoustic noise determination and depicts a measurement configuration and operations that occur at various positions in three-dimensional space. In the test configuration example, lateral microphones 210 are positioned 1476 feet from the centerline of the takeoff approach. A flyover microphone 212 is positioned along the takeoff approach centerline at a distance 21,325 feet from the start position. From the start of takeoff roll (A), throttles are maintained at fixed takeoff position until transition to a manual throttle cutback point (D). Normal takeoff power is applied from the start of takeoff roll (A), through a position (V1) at which takeoff decision speed is attained, through liftoff (B), start of first constant climb (C), and establishment of climb (C*) at an altitude greater than 35 feet from the takeoff surface. The automatic takeoff thrust management system begins a programmed lapse rate (PLR) downtrim when aircraft flight and system parameters indicate that climb is safely established (C*). Manual throttle modulation for cutback begins (D) at an altitude determined by FAA specifications based on the aircraft design configuration. The climb profile transitions from the start of manual power cutback (D) to start of a second constant climb (E). The aircraft passes over the flyover microphone 212 at the end of the noise certification flight path (F).

Figure 3:
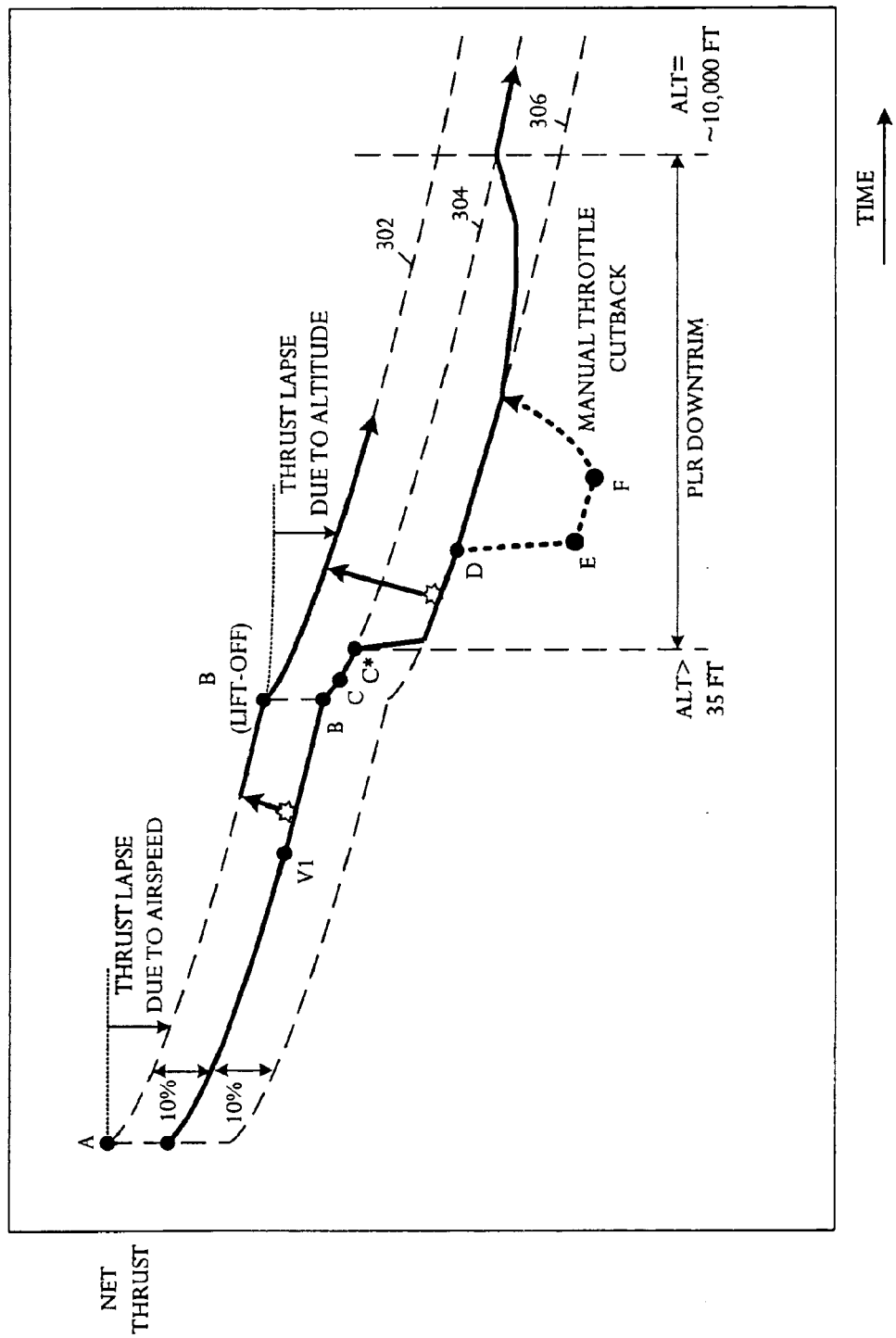
FIG. 3 is a graph that illustrates a notational time history of engine thrust for multiple scenarios that may occur during the take-off climb profile.

Referring to FIG. 3, a graph illustrates a notational time history of engine thrust for multiple scenarios that may occur during the take-off profile climb. The graph shows net thrust (FN) as a function of time. A natural thrust lapse due to increasing airspeed and altitude causes a general downward thrust trend with increasing time. During a normal takeoff, a programmed lapse rate (PLR) downtrim reduces available thrust to an operating schedule 306 generally parallel to the initial 304 schedule or a maximum one-engine-inoperative (OEI) schedule 302. In the illustrative example, at takeoff (A) the maximum OEI takeoff rating is approximately ten percent higher than the normal takeoff rating. The PLR schedule is approximately ten percent less than the initial schedule.

The aircraft typically begins the start of takeoff roll (A) at the normal takeoff rating and progresses on that initial schedule 304. The aircraft reaches the takeoff decision speed (V1). If the Automatic Takeoff Thrust Management System system detects engine failure or low thrust after the aircraft reaches the takeoff decision speed (V1), the system selects the one-engine-operative (OEI) rating schedule 302, boosting thrust, illustratively by approximately ten percent, and lifting-off (B) using elevated thrust. Otherwise, in normal conditions the engines continue on the initial schedule 304 through lift-off (B), start of first constant climb (C), and determination that climb is established (C*) at an altitude at least 35 feet above the takeoff surface. When climb is established (C*), the automatic takeoff thrust management system reduces thrust to the programmed lapse rate (PLR) downtrim and the takeoff climb proceeds according to the PLR schedule 306. The Automatic Takeoff Thrust Management System continues to monitor for opposite engine failure or low thrust and, if detected, responds by removing PLR downtrim and increasing available thrust to the OEI rating schedule 302. In normal conditions, in absence of engine failure or low thrust, the Automatic Takeoff Thrust Management System maintains the PLR downtrim, for example reducing thrust by approximately ten percent. At or above a selected altitude above the takeoff surface, as determined by FAA regulations, manual throttle reductions may be made during climb for further noise abatement. A pilot may make throttle lever movements to modulate thrust between normal idle levels 304 and the PLR schedule 306.

In the event of an engine failure, available thrust from the operating engine is reset to the OEI schedule 302 and, if the pilot moves the manual throttle, thrust is modulated between normal idle levels and the increased OEI schedule.

Figure 4:
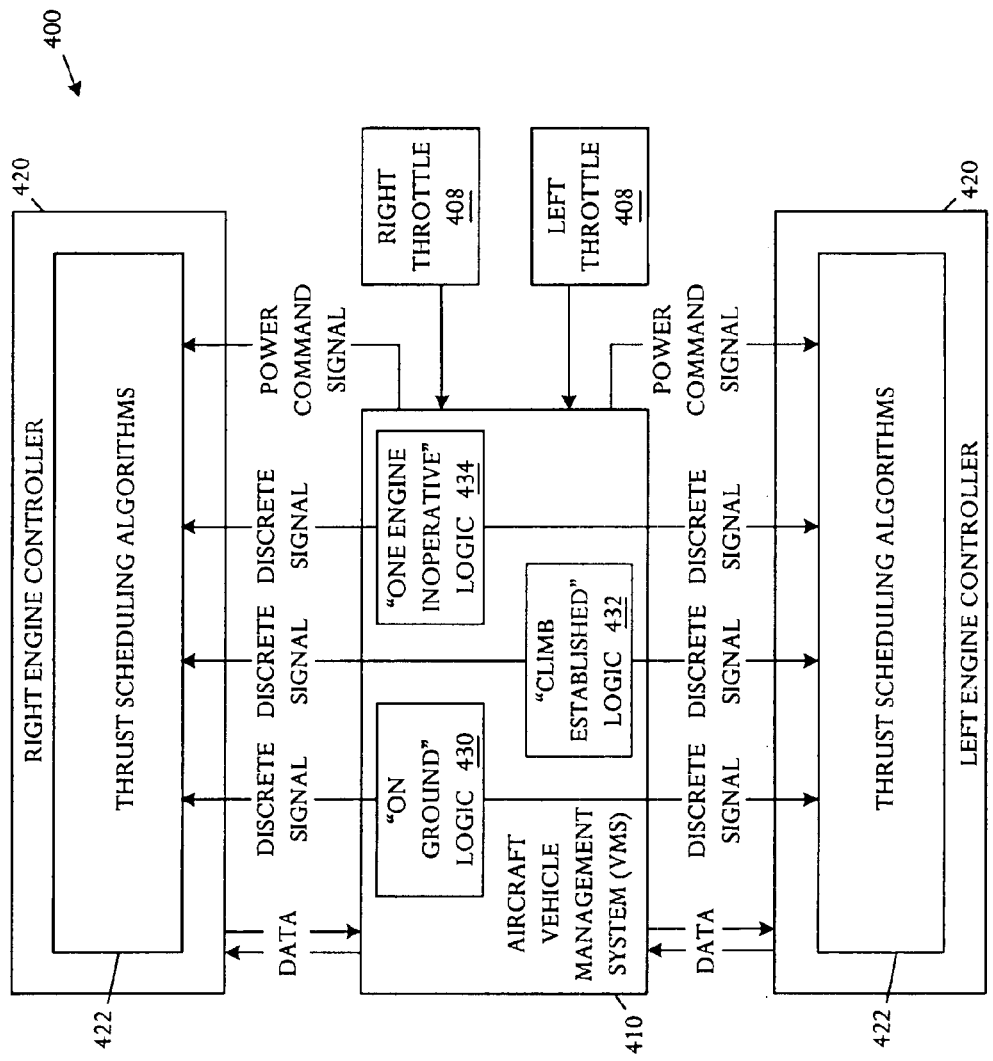
FIG. 4 is a schematic block diagram illustrating an "aircraft-centric" automatic takeoff thrust management system that implements a programmed lapse rate.
Figure 5:
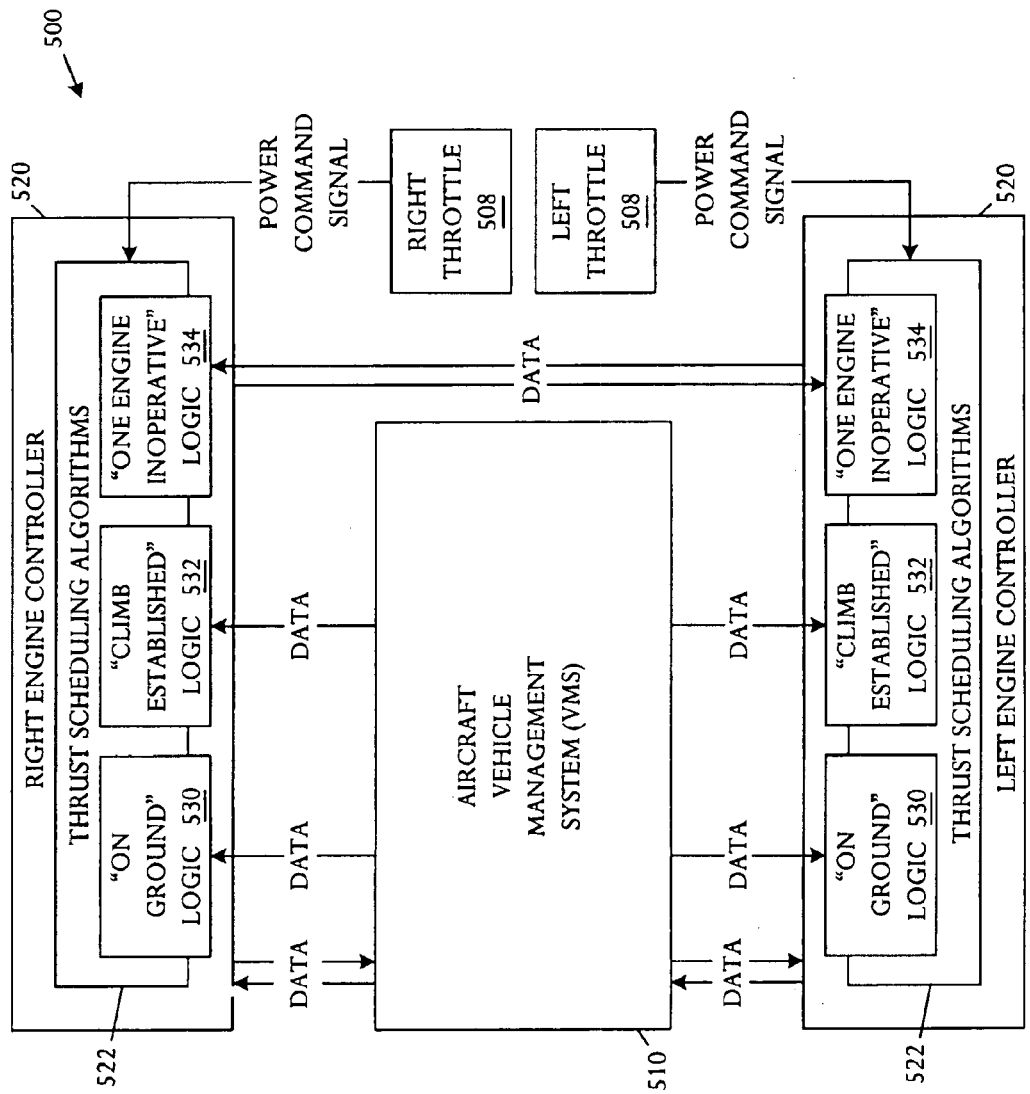
FIG. 5 is a schematic block diagram illustrating an "engine-centric" automatic takeoff thrust management system that implements a programmed lapse rate.

Referring to FIGS. 4 and 5, schematic block diagrams respectively depict examples of automatic takeoff thrust management system embodiments 400 and 500. In an illustrative example, an automatic takeoff thrust management system can be implemented with logical elements distributed among the thrust controller 114 and engine thrust control modules 124 and 134 shown in FIG. 1. The automatic takeoff thrust management system embodiments 400 and 500 are shown in dual-engine implementations with each engine comprising an engine controller element 420 and 520, respectively. In some systems, each engine controller stores rating schedule information including maximum continuous, programmed lapse rate (PLR), One-Engine-Inoperative (OEI), flight idle, and ground idle rating schedules. The illustrative automatic takeoff thrust management system embodiments 400 and 500 each also comprise an aircraft Vehicle Management System (VMS) 410 and 510, respectively. Decision logic that selects from among the rating schedules may reside in the engine controllers, the aircraft Vehicle Management System (VMS), or may be distributed among the VMS and engine controllers.

The automatic takeoff thrust management system embodiments 400 and 500 illustrate two example architectures for functional partitioning. Depicted signal and data flows do not necessarily represent separate physical signal connections since many signals may also or otherwise be combined onto data buses with appropriate redundancy. In various embodiments, physical interfaces may be digital data buses, analog wires, wireless controls, and other communication elements, or may be combinations of interfaces.

Referring to FIG. 4, a schematic block diagram illustrates an "aircraft-centric" automatic takeoff thrust management system 400, a configuration that predominantly positions logical elements for selecting thrust schedules in the aircraft Vehicle Management System (VMS) 410. The automatic takeoff thrust management system 400 further comprises right and left engine controllers 420, each of which further comprises thrust scheduling algorithms 422. Functional interfaces from the VMS 410 to the right and left engine controllers 420 are discrete on/off signals that manage direct thrust schedule selection. Signals from cockpit throttle levers 408 are routed to the VMS 410, which responds by communicating commands to the engine controllers 420. VMS 410 can pass the commands through without change or can modify the commands. The discrete signals from VMS 410 are generated from among an "ON GROUND" logic element 430, a "CLIMB ESTABLISHED" logic element 432, and a "ONE ENGINE OPERATIVE (OEI)" logic element 434.

Referring to FIG. 5, a schematic block diagram illustrates an "engine-centric" automatic takeoff thrust management system 500, a configuration that predominantly positions logical elements for selecting thrust schedules in right and left engine controller elements 520. The aircraft Vehicle Management System (VMS) 510 predominantly supplies the engine controllers 520 with data used to execute schedule selection logic contained within each of the right and left engine controllers 520. Each of the right engine and left engine controllers 520 comprise thrust scheduling algorithms 522 that further comprise schedule selection logic elements, including an "ON GROUND" logic element 530, a "CLIMB ESTABLISHED" logic element 532, and a "ONE ENGINE OPERATIVE (OEI)" logic element 534. Data from the VMS 510 supplied to the logic elements includes weight-on-wheels (WOW) sensor information, main landing gear (MLG) attitude and configuration information, airspeed, altitude, and other information. Each of the right and left cockpit throttle levers 508 is connected directly to the corresponding right and left engine controllers 520 to supply engine throttle control signals. Signals from the throttle levers 508 in combination with other engine parameter information pass through the right and left engine controllers 520 and are supplied to the VMS 510 via separate data paths from each engine controller 520.

Figure 6:
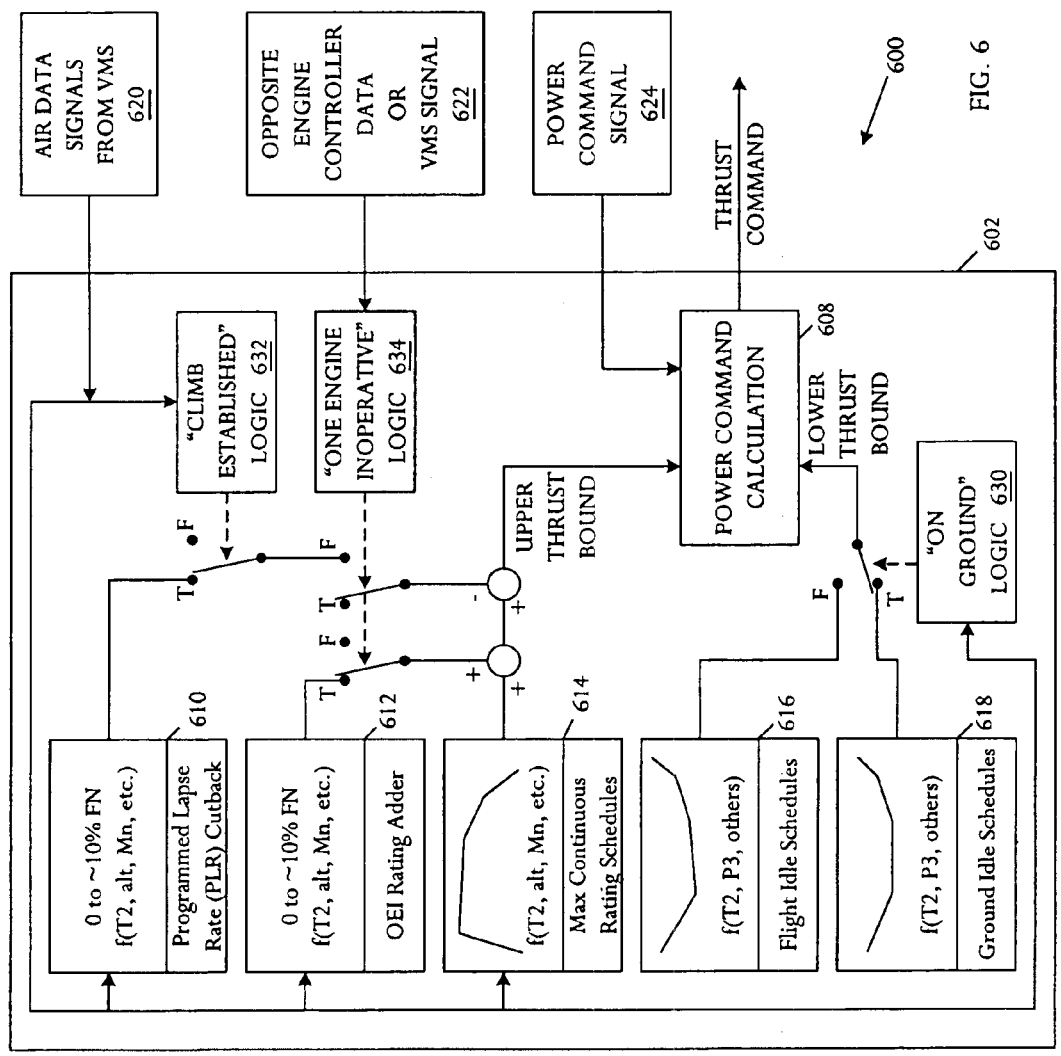
FIG. 6 is a schematic block diagram showing an example of a thrust command logic structure.

Referring to FIG. 6, a schematic block diagram shows an example of a thrust command logic structure 600 for implementing engine controller thrust scheduling algorithms. In the illustrative embodiment, the thrust command logic structure 600 include logical structures that are shared among interrelated logic elements including an "ON GROUND" logic element 630, a "CLIMB ESTABLISHED" logic element 632, and a "ONE ENGINE OPERATIVE (OEI)" logic element 634. Engine controller thrust scheduling algorithms 602 combine the logical elements 630–634 and a plurality of logical functions including a Programmed Lapse Rate (PLR) Cutback function 610, a "One Engine Inoperative" (OEI) rating adder function 612, a maximum continuous rating schedule function 614, a flight idle function 616, and a ground idle schedule function 618. The illustrative example shows schedule selection logic elements 630–634 contained within the engine controller thrust scheduling algorithms 602. In some other embodiments, the schedule selection logic elements 630–634 can be located elsewhere, for example in the Vehicle Management System (VMS).

Air data and signals from the aircraft Vehicle Management System (VMS) activate rating schedules and adjustments for PLR cutback and OEI supplementation via communication with functions 610–618. The "CLIMB ESTABLISHED" logic element 632 activates the Programmed Lapse Rate (PLR) Cutback function 610 to invoke the programmed lapse rate. The OEI logic element 634, as directed by opposite engine controller data or a VMS signal 622, activates the OEI rating adder function 612 to add thrust when an engine is inoperative or thrust is otherwise low. When opposite engine controller data or VMS signals 622 activate OEI logic 634, the programmed lapse rate (PLR) logic path is interrupted so that full OEI thrust becomes available. The maximum continuous rating schedule function 614 determines an upper thrust bound level subject to correction by the OEI rating adder function 612 or PLR cutback function 610. Thrust reduction by the PLR cutback function 610, thrust increase by the OEI rating adder function 612, and form of the continuous rating schedule function 614 can vary in amount and form based on ambient, engine, and aircraft conditions including temperatures, pressures, and other parameters.

In conditions determined by air data signals from VMS 620, the "ON GROUND" logic 630 selects from among the flight idle schedules 616 and ground idle schedules 618 to determine a lower thrust bound. Form of the flight idle schedules 616 and the ground idle schedules 618 vary according to various ambient, engine, and aircraft conditions including temperatures, pressures, and other parameters.

Idle schedules 616, 618 or high power schedules 614 can define the lower and upper thrust bounds. In either case, cockpit throttle lever command signals 624 are mapped between the bounds to generate continuous and essentially linear thrust response between idle and takeoff stops on the cockpit throttle quadrant.

Figure 7:
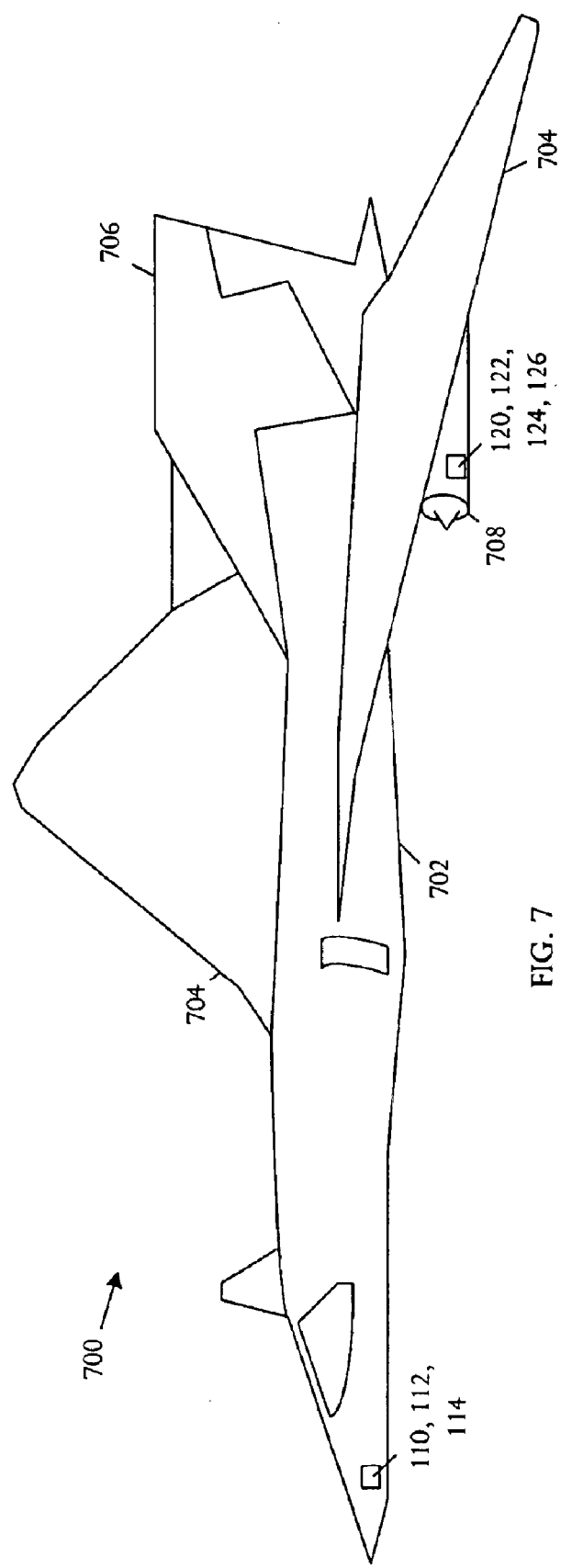
FIG. 7 is a schematic pictorial diagram showing an example of an aircraft that implements the described automatic takeoff thrust management system.

Referring to FIG. 7 in combination with FIG. 1, a schematic pictorial view depicts an aircraft that comprises the described automatic takeoff thrust management system. In a particular embodiment, the aircraft is a Quiet Supersonic Transport (QSST) aircraft. The aircraft 700 comprises an airframe 702 or fuselage, wings 704, engines 708 attached to the wings 704, and tail 706. Interior to the aircraft 700 and shown in block diagram form is the computer 110, aircraft status sensors 112, engine failure detectors 122 and 132, and engine thrust control modules 124 and 134.

In an illustrative embodiment, the aircraft 700 is a high performance aircraft that has design characteristics specifying excess thrust for all-engine takeoff climb, full thrust for takeoff roll, and full thrust for engine-out takeoff climb. In some embodiments, the high performance aircraft 700 is a supersonic transport aircraft. The high performance aircraft 700 is designed for high performance cruise capability and accordingly has wings, aerodynamics and engines to attain best cruise performance. Increased maximum thrust level are required to achieve design takeoff field lengths but result in excess all-engine climb capability.

A disadvantage of increasing thrust to decrease the required takeoff field is that all-engine climb is greater than required to meet FAA requirements. Use of full takeoff thrust for all-engine takeoff climb can result in higher than desired noise levels. Current Federal Aviation Administration (FAA) airworthiness standards define takeoff procedures where no change in thrust that requires action by the pilot may be made until the airplane is 400 feet above the takeoff surface. The Automatic Takeoff Thrust Management System enables automatic thrust management to reduce noise.

The computer 110, aircraft sensors 112, engine failure detectors 122 and 132, and engine thrust control modules 124 and 134 operate in combination as the Automatic Takeoff Thrust Management System 100. The Automatic Takeoff Thrust Management System 100 operates to satisfy Federal Aviation Administration (FAA) requirements and reduce community noise exposure. The automatic takeoff thrust management system 100 reduces thrust after takeoff climb is established, but, in the event of engine failure, increases thrust to meet FAA engine-out climb specifications.

The automatic takeoff thrust management system 100 comprises one or more aircraft status sensors 112 that supply signals to the computer 110, executing as a vehicle management computer or controller. The computer 110 responds to the sensed signals by sending signals to the engine thrust control modules 124 and 134 that control engine thrust level. In some embodiments, for normal operation the computer 110 reduces thrust by approximately ten percent when aircraft status sensors 112 indicate the aircraft 700 has established takeoff climb conditions. If either of engines 120 and 130 fails after the thrust decrease, engine status sensors in the engine failure detectors 122 and 132 detect the engine failure and restore thrust to the initial or a higher schedule.

The automatic takeoff thrust management system 100 reduces takeoff sound levels while supplying safe climb performance in the event of engine failure during takeoff.

The automatic takeoff thrust management system 100 increases power upon detection of engine failure, but also reduces thrust under normal conditions after takeoff climb has been established.

While the invention has been described with reference to various embodiments, it will be understood that these embodiments are illustrative and that the scope of the invention is not limited to them. Many variations, modifications, additions and improvements of the embodiments described are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the invention. Variations and modifications of the embodiments disclosed herein may be made based on the description set forth herein, without departing from the scope and spirit of the invention as set forth in the following claims.

For example, although the specification describes the "aircraft-centric" and "engine-centric" architectures in detail, other suitable architectures may be used including combined approaches that allocate some control elements to a central management system and other control elements to systems more associated with the engines. Various implementations may take into account the particular sensors and information for making control decisions. Some implementations may centralize control decisions; other implementations may distribute control. Logic elements distributed into engines may implement control functionality tailored to the particular engine characteristics, and designed practices.

Also, although thrust is described as reduced by approximately ten percent during takeoff climb, other percentage reductions may be used depending on safety consideration, aircraft performance, engine capabilities, and the like.

What is claimed is:

1. An automatic takeoff thrust management system for usage in an aircraft with at least two engines, the control system comprising:
   at least one aircraft Status sensor capable of detecting establishment of takeoff climb conditions according to an initial schedule;
   at least one engine failure detector coupled to one or more of the at least two engines and capable of detecting engine failure;
   at least one thrust control module coupled to one or more of the at least two engines and capable of controlling engine thrust; and
   a controller coupled to the at least one aircraft status sensor, the at least one engine failure detector, and the at least one thrust control module, the controller automatically, absent any pilot input, reducing thrust by a selected amount upon detecting establishment of takeoff climb conditions and, if engine failure is detected, restoring thrust to at least the initial schedule.

2. The control system according to claim 1 wherein:
   the controller reduces thrust by a selected first amount upon detecting establishment of takeoff climb conditions.

3. The control system according to claim 1 wherein:
   the controller reduces thrust by approximately ten percent (10%) upon, detecting establishment of takeoff climb conditions.

4. The control system according to claim 1 wherein:
   the at least one aircraft status sensor is selected from among a group comprising airspeed, engine speed or mach number sensors, engine inlet temperature sensors, engine revolutions per minute sensors, engine inlet pressure sensors, and weight on wheels sensors.

5. The control system according to claim 1 wherein:
   the at least one engine failure detector is selected from among a group comprising:
   engine rotational speed sensors;
   engine pressure ratio sensors;
   exhaust gas temperature sensors;
   oil quantity sensors;
   temperature sensors comprising inlet, external air, compressor, turbine, bleed air, exhaust temperature sensors;
   pressure sensors including inlet, compressor, discharge, lubrication oil, and bleed air pressure sensors;
   vibration sensors including sensors capable of detecting vibration in afterburners, rotors, shafts, bearings, redaction gears, and transmissions;
   detectors of hours of operation, start times, fatigue, stresses, and cracks; and
   monitors of speeds, rotational speeds, engine pressure ratios, throttle position, nozzle position, stator position, fuel flow, throttle position, and torque.

6. An aircraft comprising:
   a fuselage;
   wings coupled to the fuselage;
   at least two engines mounted on the aircraft; and
   an automatic takeoff thrust management system including:
      at least one aircraft status sensor capable of detecting establishment of takeoff climb conditions according to an initial schedule;
      at least one engine failure detector coupled to one or more of the at least two engines and capable of detecting engine failure;
      at least one thrust control module coupled to one or more of the at least two engines and capable of controlling engine thrust; and
      a controller coupled to the at least one aircraft status sensor, the at least one engine failure detector, and the at least one thrust control module, the controller capable of automatically, absent any pilot input, reducing thrust by a selected amount upon detecting establishment of takeoff climb conditions, and, if engine failure is detected, restoring thrust to at least the initial schedule.

7. The aircraft according to claim 6 wherein:
   the controller reduces thrust by a selected first amount upon detecting establishment of takeoff climb conditions.

8. The aircraft according to claim 6 wherein:
   the controller reduces thrust by approximately ten percent (10%) upon detecting establishment of takeoff climb conditions.

9. The aircraft according to claim 6 wherein;
   the aircraft is a high performance aircraft with design characteristics that specify excess thrust for all engine takeoff climb, full thrust for takeoff roll, and full thrust for engine-out takeoff climb.

10. The aircraft according to claim 6 wherein:
    the aircraft is a supersonic transport aircraft.

11. The aircraft according to claim 6 wherein:
    the aircraft is a high performance aircraft designed for high performance cruise capability and accordingly has wings, aerodynamics and engines to optimize cruise performance, wherein increased maximum thrust level reduces takeoff field length and increases excess all-engine climb capability.

12. A method of automatically managing takeoff thrust in an aircraft with at least two engines comprising:
    detecting establishment of takeoff climb conditions according to an initial schedule;

detecting engine failure if engine failure occurs; and automatically, absent any pilot input:

reducing thrust by a selected amount upon detecting establishment of takeoff climb conditions; and if engine failure is detected, restoring thrust to at least the initial schedule.

13. The method according to claim 12 filer comprising:

reducing thrust by a selected first amount upon detecting establishment of takeoff climb conditions.

14. The method according to claim 12 further comprising:

reducing thrust by approximately ten percent (10%) upon detecting establishment of takeoff climb conditions.

15. An article of manufacture comprising:

a computer usable medium having computer readable program code means embodied therein for detecting establishment of takeoff climb conditions according to an initial schedule;

a computer readable program code means for detecting engine failure if engine failure occurs; and a computer readable program code means for automatically, absent any pilot input, reducing thrust by a selected amount upon detecting establishment of takeoff climb conditions and, when engine failure is detected, restoring thrust to at least the initial schedule.

16. The article of manufacture according to claim 15 further comprising:

a computer readable program code means for reducing thrust by a selected first amount upon detecting establishment of takeoff climb conditions.

17. The article of manufacture according to claim 15 further comprising:

a computer readable program code means for reducing thrust by approximately ten percent (10%) upon detecting establishment of takeoff climb conditions.

18. An automatic takeoff thrust management system for an aircraft comprising:

an aircraft vehicle management system further comprising a plurality of logic elements capable of selecting an aircraft thrust schedule, a first logic element being capable of modulating thrust as the aircraft establishes takeoff climb conditions to reduce thrust and takeoff sound level, and a second logic element being capable of increasing thrust in response to detection of engine failure; and a plurality of engine controller systems each coupled to the aircraft vehicle management system and associated with and capable of controlling an aircraft engine of a plurality of aircraft engines, the individual engine controllers further comprising a plurality of thrust scheduling algorithms that control thrust scheduling automatically, absent any pilot input.

19. The automatic takeoff thrust management system according to claim 18 wherein the plurality of logic elements comprises:

a climb established logic that reduces thrust upon detecting establishment of takeoff climb conditions;

a one-engine-inoperative logic that increases thrust upon detection of a condition including engine failure and low thrust; and an on-ground logic that selects an idle thrust schedule.

20. An automatic takeoff thrust management system for an aircraft comprising:

an aircraft vehicle management system; and a plurality of engine controller systems coupled to the aircraft vehicle management system and associated with and capable of controlling an aircraft engine of a plurality of aircraft engines, the individual engine controller systems further comprising a plurality of thrust scheduling algorithms and a plurality of logic elements capable of selecting an aircraft thrust schedule that control thrust scheduling automatically, absent any pilot input, a first logic element being capable of modulating thrust as takeoff climb is established to reduce thrust and takeoff sound level, and a second logic element being capable of increasing thrust in response to detection of engine failure.

21. The automatic takeoff thrust management system according to claim 20 wherein the plurality of logic elements comprises:

a climb established logic that reduces thrust upon detecting establishment of takeoff climb conditions;

a one-engine-inoperative logic that increases thrust upon detection of a condition including engine failure and low thrust; and an on-ground logic that selects an idle thrust schedule.

22. The control system according to claim 1 further comprising:

a programmed lapse rate cutback function executable in the controller that receives airspeed and/or altitude signals from the at least one aircraft status sensor, automatically detects a lift-off condition based on the airspeed and/or altitude signals, and automatically lapses thrust on detection of the lift-off condition.

23. The control system according to claim 1 further comprising:

a programmed lapse rate cutback function executable in the controller that receives signals from the at least one aircraft status sensor and automatically lapses thrust using a selected thrust reduction characteristic that is programmed into control schedules that respond to signals received from the at least one aircraft sensor and control actuators.

24. The control system according to claim 1 further comprising:

a plurality of cooperative logical elements coupled to and executable on the controller to generate a thrust command, the cooperative logical elements including a programmed lapse rate cutback unction capable of automatically reducing thrust at lift-off, a one engine inoperative rating adder that automatically adds thrust in response to an inoperative condition of an engine, and a maximum continuous rating schedule that sets an upper thrust limit correctable for one engine operative rating.

25. The control system according to claim 24 wherein:

the plurality of cooperative logical elements further comprises a flight idle schedule and a ground idle schedule.

* * * * *